G. C., E. C. & W. B. HOLYFIELD.
COMBINED HARROW AND LAND ROLLER.
APPLICATION FILED DEC. 7, 1912.

1,068,772.

Patented July 29, 1913.

2 SHEETS—SHEET 1.

WITNESSES
Jas. F. McCathran
J. Stewart Rice

G. C. Holyfield
E. C. Holyfield
W. B. Holyfield
INVENTORS

BY
ATTORNEY.

G. C., E. C. & W. B. HOLYFIELD.
COMBINED HARROW AND LAND ROLLER.
APPLICATION FILED DEC. 7, 1912.
1,068,772.
Patented July 29, 1913.
2 SHEETS—SHEET 2.
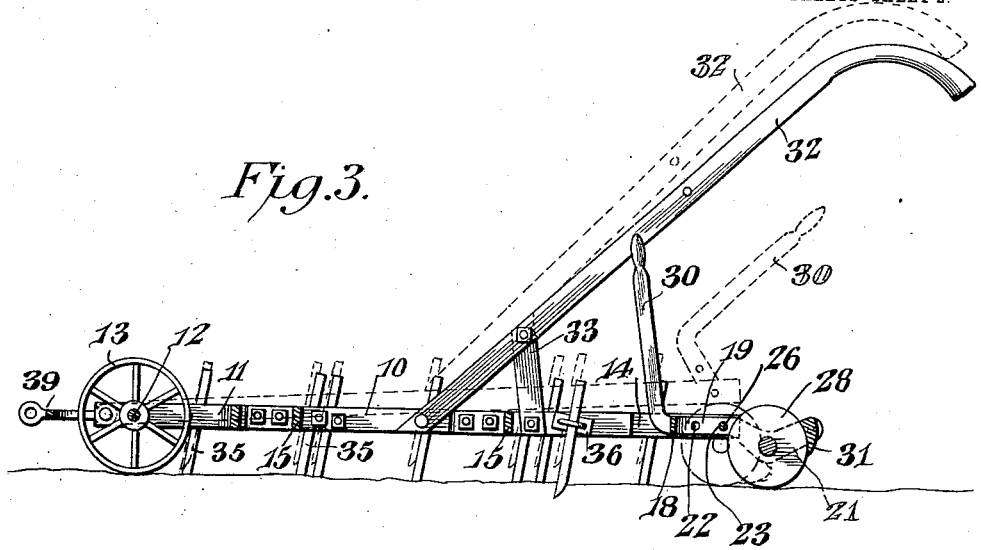
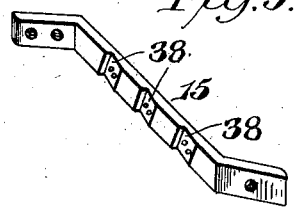
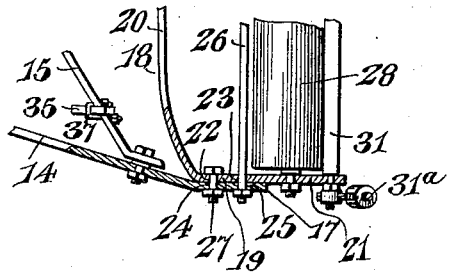
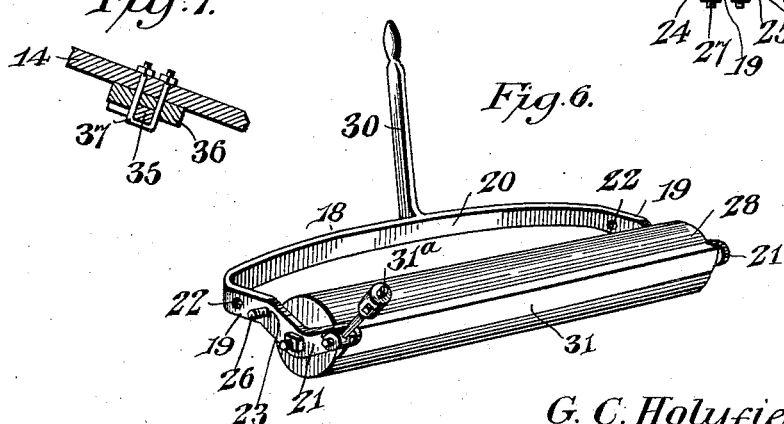
WITNESSES
Jas. K. McCathran
J. Stewart Rice.
G. C. Holyfield
E. C. Holyfield
W. B. Holyfield
INVENTORS
BY
ATTORNEY

UNITED STATES PATENT OFFICE.

GROVER C. HOLYFIELD, EDWARD C. HOLYFIELD, AND WALTER B. HOLYFIELD, OF DAMASCUS, ARKANSAS.

COMBINED HARROW AND LAND-ROLLER.

1,068,772. Specification of Letters Patent. Patented July 29, 1913.

Application filed December 7, 1912. Serial No. 735,461.

*To all whom it may concern:*

Be it known that we, GROVER C. HOLYFIELD, EDWARD C. HOLYFIELD, and WALTER B. HOLYFIELD, citizens of the United States, residing at Damascus, in the county of Faulkner and State of Arkansas, have invented a new and useful Combined Harrow and Land-Roller, of which the following is a specification.

Our invention relates to improvements in a combined harrow and land roller, and has for its object to construct an implement of this character so that the harrow teeth will remain in the ground and do their work properly when the roller rises, as when passing over an obstruction; the implement being so constructed that it can be operated to withdraw and raise the harrow teeth above the ground for the purpose of cleaning the teeth of trash, and at the same time furnishing a convenient means for permitting the device to travel in an inoperative position.

Other objects and advantages of our invention will appear in the following description, and the invention consists in the construction, combination and arrangement of the several parts as hereinafter set forth and then pointed out in the claims, it being understood that various changes in the form, proportion, size and minor details of construction may be resorted to without departing from the spirit of our invention or sacrificing any of the advantages thereof.

Figure 1:
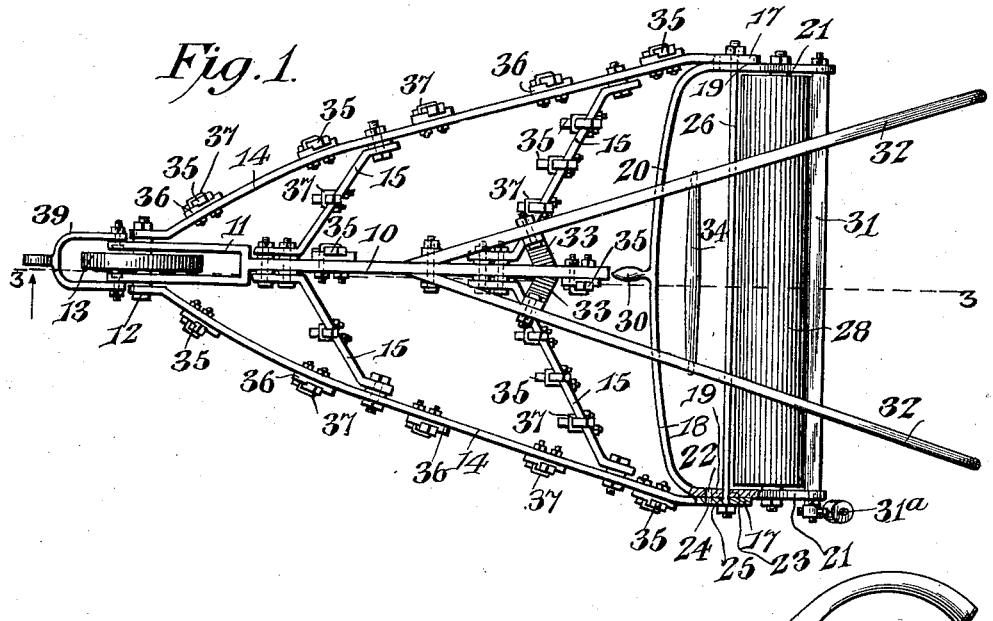
Figure 2:
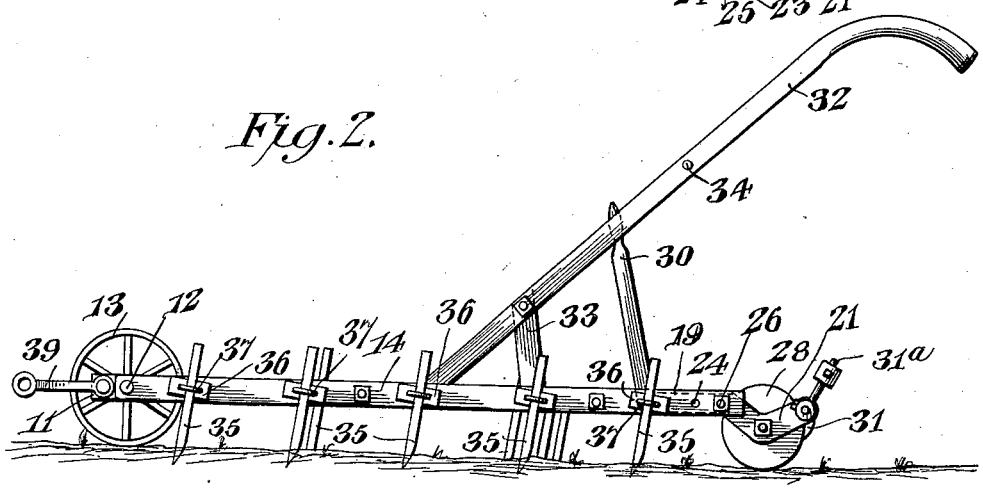

In the accompanying drawings:—Figure 1 is a top plan view of our improved harrow. Fig. 2 is a side elevation thereof. Fig. 3 is a vertical longitudinal, sectional view on the line 3—3 of Fig. 1. Fig. 4 is a top plan view, partly in section, of a portion of the roller and its associated parts. Fig. 5 is a perspective view of one of the diagonal braces. Fig. 6 is a perspective view of the roller and the auxiliary frame in which it is journaled. Fig. 7 is a sectional view of one of the side beams showing the manner of connecting a harrow tooth thereto.

Referring to the drawings, which illustrate the preferred embodiment of our invention, 10 designates a horizontally-disposed, longitudinally-extending central or main beam of a harrow frame, the front end of which is bifurcated or forked as at 11. Transversely of the forward end of the fork is mounted an axle 12 on which and within the fork is journaled a wheel 13. The ends of the axle extend beyond the outer sides of the fork, and pivotally mounted, one on each of the projecting ends, are the straight ends of horizontally-disposed side beams 14, which extend diagonally rearwardly in the same horizontal plane as the central beam. The central beam 10 and the side beams 14 are held rigidly in position against relative movement by diagonally-arranged braces 15. Each brace comprises a diagonally-disposed body having its ends bent angularly in opposite directions for connection to the central and side beams. The inner angular ends of the braces are bolted together in pairs at opposite sides of the central beam, one pair being connected at their inner ends near the inner end of the fork 11, and the second pair nearer the rear end of the central beam. Any number of these braces may be employed to suit the length of the implement.

The rear ends of the divergent side beams 14 are bent to form straight end portions 17, which are parallel with respect to each other and extend out beyond the rear end of the central beam 10. Pivotally mounted between the spaced-apart end portions 17 is an auxiliary frame 18, which, as best seen in Fig. 6, is yoke-shaped, the sides or arms 19 of which are parallel and normally horizontal and are connected together at their forward ends by a curved, transverse body portion 20. The rear or free ends of the arms 19 are bent to form downwardly-extending V-shaped portions 21. Each arm, in front of the V-shaped portion, is provided with correspondingly-located spaced apart holes 22 and 23 respectively, which register with perforations 24 and 25 in the end portions 17 of the side beams. Passing through the alined perforations 23 and 25 at each side is a rod 26 by which the auxiliary frame is pivoted in position. When it is desired to hold the auxiliary frame rigid with respect to the harrow, removable bolts 27 are passed through the registering perforations 22 and 24 at each side.

Journaled transversely between the arms 19 is a roller 28, the trunnions of which extend through holes in the lower part of the V-shaped portions 21, thereby journaling the roller below the point of pivot of the auxiliary frame. Projecting upwardly from the center of the body 20 of the auxiliary frame is an operating handle 30, which is in convenient reach of the operator.

Pivotally mounted between the extreme outer ends of the arms 19, and above the point of journaling of the roller, is a transverse scraper 31, which is held in operative relation to the roller by means of a weighted radial arm 31ª secured to one of the trunnions or pivots of the scraper.

To the central beam 10, at a point intermediate of the front and rear braces, are bolted the inner ends of rearwardly and divergently extending handles 32, which extend to a point back of the roller 28. The handles are further supported from the central beam by upwardly extending braces 33, and intermediate their length the handles are connected together by a transverse brace rod 34, which is high enough to permit the handle 30 to be swung beneath it.

At intervals along the outside of the side beams 14 are secured harrow teeth 35. Each tooth is mounted in a vertical groove in a steel block 36, and are each firmly held in position by a U-shaped bolt 37, the shanks of which pass through holes in the blocks and in the side beams. The front and rear transverse braces 15 have angular notches 38 cut in their front faces, and secured in each notch by a U-shaped bolt 37 is a harrow tooth 35. The purpose of the angular notches is to arrange the harrow teeth in the proper position on the diagonally arranged braces. A harrow tooth 35 is also secured, in a block 36 of the construction previously described, to one side of the central beam 10 back of the forward braces 15, and at the opposite side of the beam back of the rear pair of braces is similarly secured another tooth 35.

At the forward end of the fork 11 and in front of the axle 12, is mounted a horizontally-disposed clevis 39, which extends in front of the wheel 13, and to which the desired single or double draft for the implement can be attached.

While we have shown and prefer to construct the frame work of our cultivator of steel or other suitable metal, we may under certain conditions elect to construct it partly or wholly of wood. Also while we have shown a wheel 13 journaled at the front of the harrow we can, if we desire, substitute a harrow tooth for the wheel, in which case the device will be supported on the roller and the tooth, when the roller is moved to the position shown in dotted lines in Fig. 3.

From the foregoing it will be apparent that we have produced an exceedingly simple and efficient combined harrow and land roller. In use the cultivator is drawn along by one or more draft animals, as desired, and the harrow teeth 35 will be free to sink into the soil as seen in Figs. 2 and 3. When the roller 28 encounters an obstruction, such as a large stone, it rises, but owing to the pivotal connection of the auxiliary frame 18 with the harrow frame it does not affect the position or the work of the teeth. When, however, the teeth become clogged with trash, the latter is easily removed by grasping the handle 30 and drawing it back to the position shown in dotted lines in Fig. 3, when the roller will move to the position shown in dotted lines, thereby raising the harrow frame on the axle 12 and withdrawing and raising the teeth out of the soil when the trash will drop off or can be easily removed. With the cultivator in the raised position, that is, supported on the front wheel 13 and the roller 28, as shown in dotted lines in Fig. 3, the device can readily travel from place to place without the teeth engaging the ground. When the cultivator is operating over soil that is free from obstructions and trash, the auxiliary frame 18 can be held against pivotal movement by inserting the bolts 27 though the registering holes in the arms 19 of the auxiliary frame and the end portions 17 of the harrow frame. The bolts can be quickly and easily placed in position and removed as conditions warrant.

The arrangement of journaling the roller 28 below the point of pivotal connection of the auxiliary frame with the harrow frame insures that the roller can be easily moved beneath the point of pivotal connection, as shown in dotted lines in Fig. 3. Also the mounting of the scraper 31 above the journals of the roller insures that the scraper will not interfere with the movements of the roller.

What is claimed is:—

1. In a combined harrow and land roller, a front support adapted to travel upon the ground, a harrow frame pivoted to the support and provided with a plurality of harrow teeth which normally engage the ground, an auxiliary frame pivotally connected to the harrow frame at the rear, and a transversely-disposed roller journaled in the auxiliary frame at one side of the pivotal connection, whereby the roller will travel over obstructions without lifting the teeth out of the ground, said auxiliary frame having operating means for swinging it to lift the teeth out of the ground.

2. In a combined harrow and land roller, a harrow frame provided with a plurality of harrow teeth which normally engage the ground, a traveling support at the forward end of the harrow frame and to which the latter is pivoted, an auxiliary frame pivotally connected to the rear end of the harrow frame, a transversely-disposed roller journaled in the auxiliary frame at one side of the pivot, which permits free movement of the auxiliary frame to enable the roller to travel over obstructions without lifting the teeth out of the ground, and operating means for swinging the auxiliary frame on its pivot to bring the roller beneath the pivot, whereby the teeth will be lifted out of the ground and the harrow frame supported on the said support and the roller.

3. In a combined harrow and land roller, a harrow frame provided with a plurality of harrow teeth which normally engage the ground, a wheel journaled at the forward end of the harrow frame, the axle of said wheel constituting the pivot on which the harrow frame moves, an auxiliary frame pivotally connected to the rear end of the harrow frame, a transversely-disposed roller journaled in the auxiliary frame to one side of the pivotal connection, and means for swinging the auxiliary frame on its pivot to bring the roller beneath the said pivot, whereby the teeth will be lifted out of the ground and the harrow frame supported on the wheel and the roller.

4. In a combined harrow and land roller, a harrow frame provided with an open rear end, and having a plurality of harrow teeth which normally engage the ground, a wheel journaled at the forward end of the harrow frame, the axle of said wheel constituting the pivot of said frame, a yoke-shaped auxiliary frame pivotally mounted intermediate its ends in the open rear end of the harrow frame, a transversely-disposed roller journaled between the sides of the auxiliary frame to one side of the pivot, and an upwardly extending handle connected to the yoke and serving as the means to swing the auxiliary frame on its pivot to bring the roller beneath the pivot, whereby the teeth will be lifted out of the ground and the harrow frame supported on the wheel and the roller.

5. In a combined harrow and land roller, a harrow frame provided with a plurality of harrow teeth which normally engage the ground, a traveling support at the forward end of the harrow frame and on which support the harrow frame is pivoted, an auxiliary frame pivotally connected to the rear end of the harrow frame, a roller journaled in the auxiliary frame to one side of the pivot, and means for holding the auxiliary frame immovable with relation to the harrow frame when desired, said auxiliary frame being provided with operating means for swinging it on its pivot to lift the teeth out of the ground.

6. In a combined harrow and land roller, a harrow frame provided with a plurality of harrow teeth which normally engage the ground, a traveling support at the forward end of the harrow frame and on which the frame is pivoted, an auxiliary frame pivotally connected to the harrow frame, a transversely-disposed roller journaled in the auxiliary frame to one side of and below the pivot, which permits free movement of the auxiliary frame to enable the roller to travel over obstructions without lifting the teeth out of the ground, a handle connected to the auxiliary frame at the other side of the pivot for swinging the auxiliary frame to bring the roller beneath the pivot, whereby the teeth will be lifted out of the ground and the harrow frame supported on the said support and the said roller.

7. In a combined harrow and land roller, a harrow frame provided with a plurality of harrow teeth which normally engage the ground, said frame comprising a horizontally-disposed centrally-arranged beam provided with a fork at its forward end, a wheel journaled in the fork, horizontally-disposed side beams pivotally mounted on the axle of the wheel and diverging rearwardly, transverse diagonal braces connecting the side beams to the central beam, an auxiliary frame pivotally mounted between the rear ends of the side beams, a transversely-disposed roller journaled in the auxiliary frame, and means for swinging the auxiliary frame on its pivot, whereby the teeth will be raised out of the ground and the harrow frame supported on the wheel and the roller.

8. The combination with a central beam provided at its front end with a fork, side beams, an axle piercing the front end of the fork and the side beams and securing the latter to the central beam, transversely disposed braces connecting the central and side beams, a wheel mounted on the axle and arranged in the fork of the central beam, and teeth carried by the said beams and the said braces.

In testimony, that we claim the foregoing as our own, we have hereto affixed our signatures in the presence of two witnesses.

GROVER C. HOLYFIELD.
EDWARD C. HOLYFIELD.
WALTER B. HOLYFIELD.

Witnesses:
E. H. MILLER,
PAUL MARTIN.

Copies of this patent may be obtained for five cents each, by addressing the "Commissioner of Patents, Washington, D. C."